United States Patent
Haruta et al.

(10) Patent No.: US 11,498,262 B2
(45) Date of Patent: Nov. 15, 2022

(54) HEAT-SHRINKABLE POLYESTER-BASED FILM ROLL

(71) Applicant: TOYOBO CO., LTD., Osaka (JP)

(72) Inventors: Masayuki Haruta, Tsuruga (JP); Norimi Tabota, Osaka (JP)

(73) Assignee: TOYOBO CO., LTD., Osaka (JP)

(*) Notice: Subject to any disclaimer, the term of this patent is extended or adjusted under 35 U.S.C. 154(b) by 295 days.

(21) Appl. No.: 16/649,682

(22) PCT Filed: Sep. 3, 2018

(86) PCT No.: PCT/JP2018/032622
§ 371 (c)(1),
(2) Date: Mar. 23, 2020

(87) PCT Pub. No.: WO2019/065108
PCT Pub. Date: Apr. 4, 2019

(65) Prior Publication Data
US 2021/0370580 A1  Dec. 2, 2021

(30) Foreign Application Priority Data
Sep. 27, 2017  (JP) .............. JP2017-186266

(51) Int. Cl.
- B65H 18/28  (2006.01)
- B29C 61/02  (2006.01)
- B29K 67/00  (2006.01)

(52) U.S. Cl.
CPC ............ *B29C 61/02* (2013.01); *B65H 18/28* (2013.01); *B29K 2067/00* (2013.01);
(Continued)

(58) Field of Classification Search
CPC ............... B65H 18/28; B65H 2511/12; B65H 2701/1752; B65H 2513/53;
(Continued)

(56) References Cited

U.S. PATENT DOCUMENTS

| 2004/0191493 A1 | 9/2004 | Hayakawa et al. |
| 2011/0008607 A1* | 1/2011 | Haruta ............ B29C 55/14 428/500 |
| 2015/0166849 A1 | 6/2015 | Inoue |

FOREIGN PATENT DOCUMENTS

| EP | 1764206 A1 | 3/2007 |
| EP | 2208609 A1 | 7/2010 |

(Continued)

OTHER PUBLICATIONS

WPI Database, Accession No. 2007-801568 (Oct. 11, 2007).
(Continued)

*Primary Examiner* — Monica A Huson
(74) *Attorney, Agent, or Firm* — Leydig, Voit & Mayer, Ltd.

(57) ABSTRACT

The invention provides a heat-shrinkable polyester-based film roll obtained by winding a heat-shrinkable polyester-based film with a shrinkage ratio of 30% or more in a film main shrinkage direction in hot water at 90° C. for 10 seconds. The film roll has a winding length of 2000-25000 m and a width of 400-2500 mm. The film has a thickness of 5-40 μm. In thickness unevenness in a width direction of the film on a surface layer of the film roll, there are positions having concave thickness patterns, and in a concave portion that has a maximum thickness difference (maximum concave portion), thickness unevenness in the maximum concave portion, which is obtained from the maximum thickness difference in the maximum concave portion and an average thickness of the film is 10% or less. The winding hardness of the surface layer of the film roll is 400-800.

6 Claims, 1 Drawing Sheet

(52) U.S. Cl.
CPC ............... *B29K 2995/0049* (2013.01); *B29K 2995/0097* (2013.01); *B65H 2511/12* (2013.01); *B65H 2511/13* (2013.01); *B65H 2513/52* (2013.01); *B65H 2515/40* (2013.01); *B65H 2701/1752* (2013.01)

(58) Field of Classification Search
CPC . B65H 2515/40; B65H 2511/13; B29C 61/02; B29C 55/085; C08J 5/18; C08J 2367/02; C08J 2367/03; B29K 2067/00; B29K 2995/0097; B29K 2995/0049
See application file for complete search history.

(56) References Cited

FOREIGN PATENT DOCUMENTS

| | | | |
|---|---|---|---|
| EP | 3747628 A1 | 12/2020 | |
| JP | 3075019 B2 | 8/2000 | |
| JP | 2001-151907 A | 6/2001 | |
| JP | 2003-113257 A | 4/2003 | |
| JP | 2004-255671 A | 9/2004 | |
| JP | 3678220 B2 | 8/2005 | |
| JP | 2009-226939 A | 10/2009 | |
| JP | 2009-226940 A | 10/2009 | |
| JP | 2013-086263 A | 5/2013 | |
| JP | 2014-043520 A | 3/2014 | |
| JP | 2014073688 * | 4/2014 | ............ B29C 61/06 |
| JP | 5552841 B2 | 7/2014 | |
| JP | 2014-195944 A | 10/2014 | |
| JP | 5872595 B2 | 3/2016 | |

OTHER PUBLICATIONS

WPI Database, Accession No. 2008-L79945 (Aug. 28, 2008).
WPI Database, Accession No. 2013-H08281 (May 13, 2013).
WPI Database, Accession No. 2014-S44417 (Oct. 16, 2014).
WPI Database, Accession No. 2017-091676 (Feb. 2, 2017).
European Patent Office, Extended European Search Report in European Patent Application No. 18861059.6 (dated Jun. 8, 2021).
Japanese Patent Office, International Preliminary Report on Patentability in International Patent Application No. PCT/JP2018/032622 (dated Mar. 31, 2020).
Japanese Patent Office, International Search Report in International Patent Application No. PCT/JP2018/032622 (dated Oct. 16, 2018).

* cited by examiner

EXAMPLE OF CALCULATION
THICKNESS UNEVENNESS IN MAXIMUM CONCAVE PORTION = (MAXIMUM HEIGHT THICKNESS IN MAXIMUM CONCAVE PORTION − MINIMUM HEIGHT THICKNESS IN MAXIMUM CONCAVE PORTION)/AVERAGE THICKNESS × 100
= (35.2 − 32)/33 × 100
= 9.7%

TOP VIEW OF TRANSVERSELY DRAWING MACHINE

HEAT-SHRINKABLE POLYESTER-BASED FILM ROLL

CROSS-REFERENCE TO RELATED APPLICATIONS

This patent application is the U.S. national phase of International Patent Application No. PCT/JP2018/032622, filed Sep. 3, 2018, which claims the benefit of Japanese Patent Application No. 2017-186266, filed on Sep. 27, 2017, which are incorporated by reference in their entireties herein.

TECHNICAL FIELD

The present invention relates to a film roll that is obtained by winding a heat-shrinkable polyester-based film. More specifically, the present invention relates to a heat-shrinkable film roll, in which sag is favorable, and which generates small loss when it is printed or processed.

BACKGROUND ART

In recent years, for the purposes of: label packaging for protecting glass bottles, PET bottles and the like and for product description; cap sealing; assembling packaging; and the like, drawn films made of polyvinyl chloride-based resin, polystyrene-based resin, polyester-based resin and the like (so-called heat-shrinkable films) have been widely used. Among such heat-shrinkable films, polyvinyl chloride-based films have problems that they have low heat resistance, generate hydrogen chloride gas while they are incinerated, cause dioxin, and the like. Further, polystyrene-based films have problems that they have poor solvent resistance so as to require using ink with a special composition for printing, they require to be incinerated at a high temperature, and they generate a large amount of black smoke with a foul smell during the incineration. Thus, polyester-based heat-shrinkable films, which have high heat resistance, can be incinerated easily, and have excellent solvent resistance, have been utilized widely as shrinkable labels, and a used amount thereof tends to be increased according to the increase of the distribution amount of PET bottles.

Moreover, as the heat-shrinkable films, films which are shrunk largely in their width directions are generally utilized due to their easy handling during the production of labels. Thus, conventional heat-shrinkable polyester-based films have been manufactured by being drawn at high magnification in width directions so as to exhibit sufficient shrinkage force in the width directions when they are heated.

However, since such heat-shrinkable films are finally disposed as rubbish in most cases, reduction of their thicknesses has been required for environmental response. Such thickness reduction also decreases resilience of heat-shrinkable films so as to cause poor appearance of film rolls after slitting the films, thereby exposing a defect. Thus, when printing or processing the film rolls, a trouble is caused. In particular, a problem of poor flatness is caused at a location where sag is generated, and printing error or the like is further caused at the location where the sag is generated along a width direction of the film rolls, thereby causing a loss. The inventors of the present invention have been newly found that, due to such thickness reduction of films and increase of printing speed and colors, seriousness of these problems caused by sag has stood out, whereby even a film roll of a film having sag, which has been conventionally accepted with no problem, is now difficult for the application.

For forming a tube-shaped label from a heat-shrinkable film, one end portion of the film in its width direction is required to be fixed to be overlapped with other end portion. As this fixing method, a solvent bonding method (Patent Document 1), a method using an adhesive agent (Patent Document 2) and the like have been used conventionally. Among them, the solvent bonding method enables processing into a tube-shaped label at high speed, and thus has been used widely.

Since a process of processing surfaces of a heat-shrinkable polyester film into a tube-shaped label (tubing process) by this solvent bonding method can increase a production efficiency and can reduce costs, many of labels are produced by this method. However, if sag is generated at a position to which solvent is attached, lack or unevenness of adhesive strength is caused, so that it is difficult to obtain a favorable tube-shaped heat-shrinkable label. The inventors of the present invention have newly found that, also in the tubing process, according to the increase of processing speed, the seriousness of above-described problems caused by sag has stood out more, whereby even a film roll of a film having sag which has been conventionally accepted with no problem is now difficult for the application.

PRIOR ART DOCUMENTS

Patent Documents

Patent Document 1: JP-B-3075019
Patent Document 2: JP-A-2014-43520
Patent Document 3: JP-B-5552841
Patent Document 4: JP-B-3678220
Patent Document 5: JP-A-2001-151907

SUMMARY OF THE INVENTION

Problems to be Solved by the Invention

Above-described Patent Document 3 discloses winding conditions of a film roll, in which crinkles and the like are hardly generated on a surface of a polyimide film roll. However, an effect for improving sag is unknown, and improvement of film thickness unevenness of the film roll is not described.

Above-described Patent Document 4 discloses a heat-shrinkable polyester film roll which exhibits small changes in heat-shrinkability and solvent adhesiveness in the roll and has favorable thickness unevenness. However, the film roll, local thickness unevenness and sag are not described.

The present invention aims to solve the problems of a film roll made of the above-described conventional heat-shrinkage polyester film or a heat-shrinkable multilayer polyester film, and to provide a heat-shrinkable polyester film roll with less sag of a film.

Means for Solving the Problems

As a result of keen study for solving the above-described problems, the inventors of the present invention have made the present invention. That is, the present invention has following structures.

1. A heat-shrinkable polyester-based film roll, which is obtained by winding a heat-shrinkable polyester-based film that has a shrinkage ratio of 30% or more in a film main shrinkage direction in hot water at 90° C. for 10 seconds, the heat-shrinkable polyester film and the film roll satisfying following requirements (1) to (5):

(1) a winding length of the film roll is 2000 m or more and 25000 m or less;

(2) a width of the film roll is 400 mm or more and 2500 mm or less;

(3) a thickness of the film is 5 μm or more and 40 μm or less;

(4) in thickness unevenness in a width direction of the film on a surface layer of the film roll, there are positions having concave thickness patterns, and in a concave portion that has a maximum thickness difference (maximum concave portion), thickness unevenness in the maximum concave portion, which is obtained from the maximum thickness difference in the maximum concave portion and an average thickness of the film is 10% or less; and (5) winding hardness of the surface layer of the film roll is 400 or more and 800 or less.

2. The film roll made of the heat-shrinkable polyester-based film according to 1., wherein in thickness unevenness in the width direction of the film of each of samples which are obtained by sampling from the surface layer of the film roll at an interval of 1000 m in winding length, the thickness unevenness of all of the samples, each of which is obtained from the maximum thickness difference in the maximum concave portion and the average thickness of the film, is 10% or less.

3. The heat-shrinkable polyester-based film roll according to 1. or 2., wherein an absolute value of a difference in refractive index in the width direction at a maximum thickness position of either of both ends of the concave portion in the maximum concave portion is 0.01 or less.

4. The heat-shrinkable polyester-based film roll according to any one of 1. to 3., wherein thickness unevenness in an entire width direction of the film roll is 13% or less.

5. The heat-shrinkable polyester-based film roll according to any one of 1. to 4., wherein both of a static friction coefficient and a dynamic friction coefficient between a winding outer surface and a winding inner surface of the film are 0.1 or more and 0.8 or less.

Effect of the Invention

The heat-shrinkable polyester-based film roll of the present invention has less sag of a film. Thus, the film roll causes less trouble in post processing such as printing and solvent bonding, and can be used favorably.

MODE FOR CARRYING OUT THE INVENTION

Figure 1:
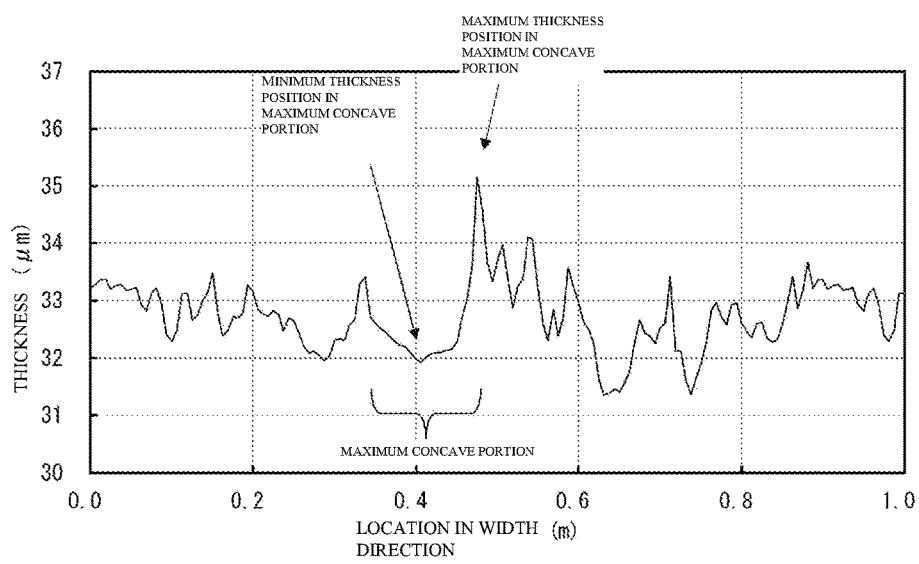
FIG. 1 is a view illustrating a maximum concave portion in thickness unevenness in a width direction of a film of the present invention.

Polyester used for the heat-shrinkable polyester-based film of the present invention contains ethylene terephthalate as a main constituent. That is, it contains ethylene terephthalate by 50 mol % or more and preferably by 60 mol % or more. As other dicarboxylic acid component that constitutes the polyester of the present invention, aromatic dicarboxylic acid such as isophthalic acid, naphthalenedicarboxylic acid and orthophthalic acid; aliphatic dicarboxylic acid such as adipic acid, azelaic acid, sebacic acid and decanedicarboxylic acid; alicyclic dicarboxylic acid; and the like can be exemplified.

In the case of containing aliphatic dicarboxylic acid (for example, adipic acid, sebacic acid, decanedicarboxylic acid and the like), a content thereof is preferably less than 3 mol %. A heat-shrinkable polyester-based film obtained by using polyester which contains any of these kinds of aliphatic dicarboxylic acid by 3 mol % or more has film resilience that is insufficient for its high-speed mounting.

Further, it is not preferable to contain trihydric or more polycarboxylic acid (for example, trimellitic acid, pyromellitic acid and anhydride of them). A heat-shrinkable polyester-based film obtained by using polyester that contains any of these kinds of polycarboxylic acid hardly attains a required high shrinkage ratio.

As a diol component which constitutes the polyester used in the present invention, aliphatic diol such as ethyleneglycol, 1,3-propanediol, 1,4-butanediol, neopentylglycol and hexanediol; alicyclic diol such as 1,4-cyclohexanedimethanol; aromatic diol such as bisphenol A; and the like can be exemplified.

The polyester used for the heat-shrinkable polyester-based film of the present invention is preferably polyester, which contains one or more kinds among: cyclic diol such as 1,4-cyclohexanedimethanol; and diol with carbon number of 3 to 6 (for example, 1,3-propanediol, 1,4-butanediol, neopentylglycol, hexanediol and the like) so as to have a glass transition point (Tg) adjusted to be 60° C. to 80° C.

Further, in the polyester used for the heat-shrinkable polyester-based film of the present invention, a sum of one or more kinds of monomer components that can be amorphous components is preferably 15 mol % or more, is more preferably 17 mol % or more, and is particularly preferably 20 mol % or more in 100 mol % of a polyhydric alcohol component or 100 mol % of a polycarboxylic acid component in the entire polyester resin. Herein, as the monomers that can be the amorphous components, for example, neopentylglycol, 1,4-cyclohexanedimethanol, isophthalic acid, 1,4-cyclohexanedicarboxylic acid, 2,6-naphthalenedicarboxylic acid, 2,2-dietyl-1,3-propanediol, 2-n-butyl-2-ethyl-1,3-propanediol, 2,2-isopropyl-1,3-propanediol, 2,2-di-n-butyl-1,3-propanediol, 1,4-butanediol and hexanediol can be exemplified, and among them, neopentylglycol, 1,4-cyclohexanedimethanol and isophthalic acid are preferably used.

It is preferable that the polyester used for the heat-shrinkable polyester-based film of the present invention does not contain diol with the carbon number of 8 or more (for example, octanediol and the like) or trihydric or more polyhydric alcohol (for example, trimethylolpropane, trimethylolethane, glycerin, diglycerin and the like). The heat-shrinkable polyester-based film obtained by using polyester that contains any of these kinds of diol and polyhydric alcohol hardly attains the required high shrinkage ratio.

Further, into the resin for forming the heat-shrinkable polyester-based film of the present invention, various kinds of additives, for example, wax, an antioxidant, an antistatic agent, a nucleating agent, a viscosity reducer, a heat stabilizer, a coloring pigment, a coloring inhibitor, a ultraviolet absorber and the like can be added as necessary. Into the resin for forming the heat-shrinkable polyester-based film of the present invention, fine particles are preferably added as a lubricant so that workability (slipperiness) of a polyethylene terephthalate-based resin film may be favorable. As the fine particles, arbitrary fine particles can be selected, but as inorganic fine particles, for example, silica, alumina, titanium dioxide, calcium carbonate, kaolin, barium sulfate and the like can be exemplified. Further, as organic fine particles, for example, acrylic resin particles, melamine resin particles, silicone resin particles, crosslinked polystyrene particles and the like can be exemplified. An average particle diameter of the fine particles is within a range from 0.05 μm to 3.0 μm (in the case of measuring the particle diameter by a coulter counter), and can be selected appropriately as necessary.

As a method for blending the above-described particles into the resin for forming the heat-shrinkable polyester-based film, for example, the particles can be added at any arbitrary stages for manufacturing the polyester-based resin, but the particles are preferably added as slurry, in which the particles are dispersed into ethyleneglycol or the like, at an esterifying stage or a stage that is after completing an transesterification reaction and before starting a polycondensation reaction, thereby proceeding the polycondensation reaction. Also, the particles are preferably added by a method of blending slurry, in which the particles are dispersed into ethyleneglycol, water or the like, with raw materials of the polyester-based resin by a kneading extruder with a vent, a method of blending the dried particles with the raw materials of the polyester-based resin by a kneading extruder, or the like.

Further, the heat-shrinkable polyester-based film of the present invention can be subjected to corona treatment, coating treatment, flame treatment or the like so that a film surface thereof may obtain favorable adhesiveness.

Incidentally, the heat-shrinkable polyester-based film of the present invention also includes a laminate-type multilayer polyester film which has at least one polyester resin layer. If two or more polyester resin layers are laminated, these polyester resin layers may be made of polyester with the same composition or different compositions. Further, a layer that can be laminated as another layer is not limited as far as it is a thermoplastic resin layer, but a polystyrene-based resin layer is preferable due to its cost and heat-shrinking property.

Moreover, while being treated in hot water at 90° C. with no load for 10 seconds, the heat-shrinkable polyester-based film of the present invention is required to have a heat-shrinkage ratio in a main shrinkage direction of the film that is 30% or more, which is calculated by following Formula 1 from its respective lengths before and after shrinkage (that is, a hot water shrinkage ratio at 90° C.)

Heat-Shrinkage Ratio={(Length before Shrinkage−Length after Shrinkage)/Length before Shrinkage}×100(%)   Formula 1

If the hot water shrinkage ratio at 90° C. in the main shrinkage direction is less than 30%, since a shrinkage amount is small, crinkles or lack of shrinkage is generated on a label after the heat shrinkage, whereby such a film is not preferable as the heat-shrinkable film. The hot water shrinkage ratio at 90° C. in the main shrinkage direction is preferably 35% or more, and is more preferably 40% or more.

Further, a winding length of the heat-shrinkable polyester-based film roll of the present invention or the heat-shrinkable multilayer polyester-based film roll is preferably 2000 m or more and 25000 m or less. During processing such as printing, if the winding length is higher, a frequency of changing rolls can be reduced, so that working efficiency can be higher. The winding length is preferably 3000 m or more, is further preferably 4000 m or more, and is particularly preferably 5000 m or more. An upper limit thereof is not particularly determined, and the higher winding length is better, but, since the inventors can examine the winding length of up to 25000 m, the upper limit of the winding length is set to be 25000 m. Incidentally, if the winding length of the film roll is higher, an area of the film is larger, and opportunities of generating defects of sag are increased, whereby the higher winding length of the film roll accompanies further difficulties in the embodiments of the present invention.

Further, a width of the heat-shrinkable polyester-based film roll of the present invention is preferably 400 mm or more and 2500 mm or less. It is preferable if the width of the film roll is higher with no particular upper limit, because losses in the printing process can be smaller, but, since the inventors can examine the width of up to 2500 mm, an upper limit of the width is set to be 2500 mm. Moreover, it is preferable if the width of the film roll is higher, because the efficiency in processing such as printing can be higher as described above. The width is preferably 500 mm or more, is further preferably 600 mm or more, and is particularly preferably 800 mm or more. Incidentally, if the width of the film roll is higher, the area of the film is larger, and the opportunities of generating defects of sag are increased, whereby the higher width of the film roll accompanies further difficulties in the embodiments of the present invention.

Further, a thickness of the heat-shrinkable polyester-based film of the present invention is preferably 5 μm or more and 40 μm or less. An upper limit of the film thickness is more preferably 35 μm or less, and is further preferably 30 μm or less. Since only the thickness of 5 μm or more is examined in the present invention, the film thickness is set to be 5 μm or more. Moreover, the higher film thickness accompanies higher resilience and less sag, which is a preferable tendency with no problem, but the higher film thickness is against environmental response of the reduction in thickness. Incidentally, if the film thickness is lower, sag is more likely to be generated, whereby the lower film thickness accompanies further difficulties in the embodiments of the present invention.

Further, the heat-shrinkable polyester-based film roll of the present invention has a position that a thickness pattern makes a concave portion in thickness unevenness in the width direction of the film roll, and thickness unevenness in a maximum concave portion, which is obtained by below Formula 2 from a maximum thickness difference at a concave portion that has the maximum thickness difference (maximum concave portion) and an average film thickness, is preferably 10% or less (its example will be shown in FIG. 1).

Thickness Unevenness in Concave Portion=(Maximum Height Thickness in Concave Portion−Minimum Height Thickness in Concave Portion)/Average Thickness×100(%)   Formula 2

Incidentally, the concave portion in the present invention denotes a part having a thickness pattern of a mountain portion—a valley portion—a mountain portion, where, in the thickness unevenness in the film width direction measured by a continuous contact-type thickness meter as described below, the mountain portion denotes a point at which the thickness starts to be decreased along both of measurement directions, and the valley portion denotes a point at which the thickness starts to be increased along both of the measurement directions. Incidentally, a film which does not have such a thickness pattern, that is, a film having no concave portion is not included in the present invention. In two mountain portions and one valley portion in the concave portion, a larger value of thickness differences between the respective mountain portions and the valley portion (if they are the same values, the both values) is called as the maximum thickness difference in the concave portion.

It is not preferable if the thickness unevenness in the maximum concave portion is higher than 10%, because air is involved and enclosed into a film roll while slitting the film at a location of the concave portion and winding the film as the film roll, and the air is subsequently released while storing the film roll, thereby causing crinkles and sag. Further, the concave portion has a thickness lower than other positions along the width direction, and thus is stretched in a longitudinal direction by tension applied while slitting and winding the film as the film roll. Thus, at the position of the concave portion on the film roll, a length along the longitudinal direction is higher than other locations along the width direction, whereby sag is generated at the position. According to the investigation by the inventors of the present invention, it has been found that, particularly when a thickness difference between the concave portion and both ends thereof is large, such sag becomes apparent. The thickness unevenness in the maximum concave portion is preferably 9% or less, and is further preferably 8% or less. It is more preferable that the thickness unevenness in the maximum concave portion is lower, and 3% was the lowest in a test carried out by the inventors.

The above-described thickness unevenness in the concave portion should be measured by a continuous contact-type thickness meter which will be shown below in Examples. For example, as shown in Patent Document 5, if measuring thicknesses is performed at an interval of 30 mm to 500 mm along a measurement direction, there is a possibility that a maximum thickness difference in a concave portion is present at an unmeasured location, and a thickness difference at a precise concave portion is difficult to be obtained. The thickness unevenness in the present invention denotes a value obtained by the measurement by the continuous contact-type thickness meter.

Further, in the thickness unevenness in a width direction of the film of respective samples, which are obtained by sampling from a surface layer of the film roll of the heat-shrinkable multilayer polyester film of the present invention at an interval of 1000 m along a winding length, the thickness unevenness of all of the samples, which is obtained from their maximum thickness differences in their maximum concave portions and the film average thicknesses, is preferably 10% or less.

As described above, it is not preferable if the thickness unevenness in the maximum concave portion is higher than 10%, because air is involved and enclosed into a film roll while slitting the film at the location of the concave portion and winding the film as the film roll, and the air is subsequently released while storing the film roll, thereby causing crinkles and sag. Further, the concave portion has a thickness lower than other positions along the width direction, and thus is stretched in a longitudinal direction by tension applied during the slitting. Thus, at the position on the concave portion in the film roll, a length along the longitudinal direction becomes higher than the other positions along the width direction, whereby sag is generated at the location. According to the investigation by the inventors of the present invention, it has been found that, particularly when a thickness difference between the concave portion and both ends thereof (the thickness difference between the valley portion and the mountain portions) is large, such sag becomes apparent. Therefore, the thickness unevenness in the concave portion along the width direction of the roll is important. The thickness unevenness in the maximum concave portion is preferably 9% or less, and is further preferably 8% or less. It is more preferable that the thickness unevenness in the concave portion is lower, and 3% was the lowest in the test carried out by the inventors.

Further, in the maximum concave portion in the thickness pattern along the width direction of the heat-shrinkable polyester-based film roll of the present invention, an absolute value of a difference between refractive indices in the width direction at the maximum thickness position of either of the both ends of the concave portion (a mountain portion having a larger thickness between the above-described two mountain portions) and at the minimum thickness position of the concave portion (the above-described valley portion) is preferably 0.01 or less. If the absolute value of the difference between the refractive indices in the width direction at the maximum thickness position of either of the both ends of the concave portion and at the minimum thickness position in the concave portion is higher than 0.01, the minimum thickness position and the maximum thickness position in the concave portion have different stretchability along the longitudinal direction, so that these positions are stretched differently in the longitudinal direction by the tension applied during the slitting. Thereby, at the position where a length in the longitudinal direction is increased during the film rolling, sag is generated. An absolute value of the refractive index difference in the width direction is preferably 0.008 or less, and is further preferably 0.006 or less. It is more preferable that the absolute value of the refractive index difference in the width direction is lower, and 0.0003 was the lowest in the test carried out by the inventors.

Further, the thickness unevenness in the entire width direction of the heat-shrinkable polyester-based film roll of the present invention is 13% or less, which is obtained by below-shown Formula 3. It is not preferable if the thickness unevenness is poor, because crinkles are likely to be generated. The thickness unevenness is preferably 10% or less, and is further preferably 7% or less. It is more preferable that the value of the thickness unevenness is lower. Incidentally, as described above, a larger factor for the generation of sag is the magnitude of the thickness unevenness in the maximum concave portion.

{(Maximum Value of Thickness−Minimum Value of Thickness)/Average thickness}×100(%)  Formula 3

Moreover, both of a static friction coefficient and a dynamic friction coefficient between film surfaces of a winding outer surface and a winding inner surface of the heat-shrinkable polyester-based film of the present invention are preferably 0.1 or more and 0.8 or less. If they are less than 0.1, the film surfaces are too slippery, whereby displacement of their end faces may be caused. Further, it is not preferable if the friction coefficients are more than 0.8, because an amount of air involved in the film roll during the slitting is increased, and sag and crinkles are likely to be generated by release of the air in the concave portion during the film rolling. The friction coefficients are preferably 0.13 or more and 0.77 or less, and are further preferably 0.16 or more and 0.74 or less.

Hereinafter, a preferable method for manufacturing the heat-shrinkable polyester-based film roll of the present invention will be described.

The heat-shrinkable polyester-based film of the present invention can be obtained by melting and extruding the above-described raw materials of polyester by an extruder so as to form an undrawn film, and drawing and heat-treating the undrawn film by a below-described predetermined method. In the case of lamination, plural extruders, feed blocks and multi-manifolds may be used. Incidentally, the polyester can be obtained by polycondensing the above-described preferable dicarboxylic acid component and diol component by a well-known method. Further, two or more kinds of chip-shaped polyester are usually mixed so as to be used as the raw materials of the film.

If the two kinds of the raw materials are mixed, when they are put into the extruder, variation of raw material supply (so-called raw material segregation) is caused, whereby variation of film compositions is also caused, which may result in the thickness unevenness in the width direction (in particular, in the maximum concave portion). In order to prevent this, it is desirable that an agitator is provided into a pipe or a hopper directly above the extruder so as to mix the raw materials uniformly, and the raw materials are subsequently melted and extruded.

As a specific method for manufacturing the film and a label, the raw material chips are dried by a drier such as a hopper dryer and a puddle dryer, or a vacuum dryer, the raw materials are mixed uniformly by the agitator in the hopper above the extruder, and the mixed raw materials are extruded into a film shape at a temperature from 200° C. to 280° C. Alternatively, undried polyester raw materials which are mixed uniformly in a manner similar to the above are similarly extruded into a film shape, while removing water in a vent-type extruder. For the extrusion, either of existing methods such as a T-die method and a tubular method may be adopted, but the T-die method is preferably adopted so as to obtain favorable thickness unevenness. Incidentally, the temperature during the extrusion is determined not to excess 280° C. It is not preferable if the melting temperature is too high, because intrinsic viscosity is lowered when forming a label, and cracks are likely to be generated.

Further, a shear rate at an outlet of a die is obtained by following Formula 4.

Shear Rate $$\gamma = 6Q/(W \times H^2) \qquad \text{Formula 4}$$

γ; Share Rate (sec$^{-1}$)
Q; Discharge Amount of Raw Materials from Extruder (cm$^3$/sec)
W; Width of Opening of Die Outlet (cm)
H; Lip Gap of Die (cm)

It is more preferable that the shear rate is higher, because the thickness unevenness in the width direction (in particular, in the maximum concave portion) can be decreased. This is because, if the shear rate is higher, pressure while discharging the resin via the outlet of the T-die may be more stable. The shear rate is preferably 100 sec$^{-1}$ or more, is further preferably 150 sec$^{-1}$ or more, and is particularly preferably 170 sec$^{-1}$ or more.

It is more preferable that a draft ratio is higher, because thickness unevenness in the longitudinal direction can be favorable, but it is not preferable if the draft ratio is too high, because resin residue and the like are attached to a resin discharge portion of the die, thereby deteriorating the productivity. On the other hand, it is not preferable if the draft ratio is low, because the thickness unevenness in the longitudinal direction becomes poor. The draft ratio is preferably 10 or more and 80 or less, and is further preferably 20 or more and 70 or less.

After the extrusion, the resin is quenched so as to obtain an undrawn film. Incidentally, this "undrawn film" also includes a film to which tension required for film-feed has acted. Incidentally, as a method for quenching the melt resin, a method for obtaining a substantially unoriented resin sheet by casting the melt resin from a mouthpiece onto a rotating drum, and quenching and solidifying the melt resin can be preferably adopted.

Subsequently, after preheating the above-obtained undrawn film at 80° C. to 120° C. as necessary and preferably at 90° C. to 110° C., the film is drawn 3.5 times or more, and preferably 4 times or more and 7 times or less in a transverse direction (a direction perpendicular to an extruding direction) by a transversely drawing machine (so-called a tenter). A drawing temperature is 65° C. or more and 80° C. or less, and is preferably 70° C. or more and 75° C. or less.

Figure 2:
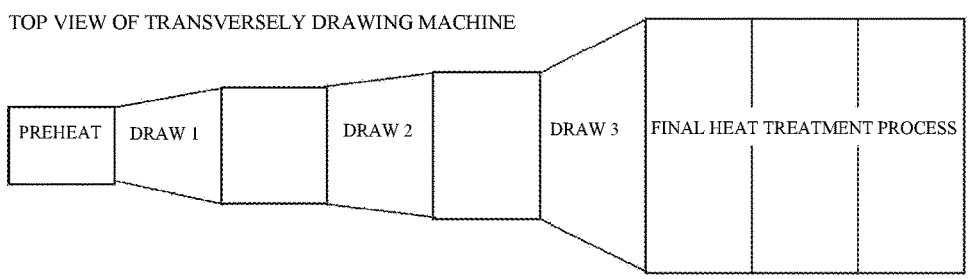
FIG. 2 is a view illustrating an example of a transverse drawing process of the film of the present invention.

Further, the transverse drawing is preferably performed by multistage drawing that is two-stage drawing or more and five-stage drawing or less. The multistage drawing is preferable, because draw stress can be changed by varying drawing temperatures at respective stages, whereby thickness unevenness in the width direction (in the maximum concave portion and in the entire width direction) can be lowered. The multistage drawing is preferably three-stage drawing or more. An example of a drawing pattern (three-stage drawing) of the transversely drawing machine will be illustrated in FIG. 2. As shown in FIG. 2, in the multistage drawing, a pattern for maintaining a determined length after completing the drawing at each stage is preferably provided. Further, a temperature pattern is preferably set to decrease the temperature by a difference of 2° C. or more at each step from a first step to a final step of the drawing.

Further, after the transverse drawing, heat treatment is preferably performed at a temperature higher than the drawing temperature by 1° C. to 30° C. The heat treatment is performed for releasing a tension state of the drawn film, and for adjusting the heat-shrinkage ratio at the temperature of the heat treatment, and also has an effect to decrease a natural shrinkage ratio. Thereby, the heat-shrinkable polyester-based film for forming the label of the present invention can be obtained.

The obtained heat-shrinkable polyester film is wound as a wide roll that is an intermediate product, is subsequently slit by a slitter to have a predetermined width and a winding length, and is wound around a winding core (core), thereby obtaining a heat-shrinkable polyester-based film roll. As the winding core, a 3-inch, 6-inch or 8-inch plastic core, metal core or paper tube can be usually used. Incidentally, a preferable length and width of the film roll are as described above.

In addition, following slitting conditions are preferably adopted so as to reduce sag that is generated at the time of the slitting.

As the specific slitting conditions, slitting is started at initial tension of 70 N/m to 120 N/m and preferably 80 N/m to 110 N/m, and at initial surface pressure of 200 N/m to 400 N/m and preferably 250 N/m to 350 N/m. It is not preferable if the initial tension is higher than 120 N/m, because a thickness unevenness portion of the concave portion is slightly stretched by the tension during the slitting, and sag may be generated thereby. On the other hand, it is not preferable if the initial tension is 70 N/m or lower, because the tension becomes insufficient while winding the film by the slit, and the end faces of the film roll becomes ununiform (so-called displacement of the end faces). After the winding length reaches 500 m, the tension is desirably decreased. More specifically, the tension is desirably decreased constantly to be associated with the winding length so that the tension at the time of 300 m before finishing the slitting may be 50% to 80%, and may be preferably 60% to 70% of the initial tension. Further, the surface pressure is applied over the entire winding length, is preferably within the initial surface pressure ±5% or less as far as possible, and is further preferably within the initial surface pressure ±3% or less.

Further, winding hardness of the surface layer of the film roll that is slit as described above is preferably 400 or more and 800 or less. It is not preferable if the winding hardness of the surface layer of the film roll is less than 400, because air that is involved into the film roll during the slitting is released while the film roll is stored, for example, in a warehouse for half a year, whereby sag is generated into the film roll. On the other hand, it is not preferable if the winding hardness of the surface layer of the film roll is more than 800, because the film roll is wound hard, and the concave portion is compressed as described above, whereby sag is generated. The winding hardness of the surface layer of the film roll is preferably 450 or more and 750 or less, and is further preferably 500 or more and 700 or less. Incidentally, the winding hardness in the present invention denotes winding hardness that is measured in accordance with below description in Examples.

Generally in an industrially produced film roll, a continuously produced film is continuously wound, and if film production conditions are constant, a degree of thickness unevenness in a width direction of the film is substantially constant over an entire winding length, but if a minute change occurs in each process in the film production, a slight change is caused to the entire winding length. The thickness unevenness in the width direction of the film is preferably controlled over the entire winding length. It can be checked whether the thickness unevenness is controlled over the entire winding length or not, by, for example, collecting samples from the surface layer of the film of the film roll per each winding length at a certain interval and measuring thickness unevenness of the respective samples. As the thickness unevenness of the film roll of the present invention, thickness unevenness obtained by the collection of a sample from the surface layer part of the film roll and the measurement of the sample can be a representative value of the film roll. In the present invention, as described below in Examples, a sample is collected from a part where 1 m of the film is removed from the surface layer of the film roll, and the sample is measured so as to obtain the representative value. The preferable range of the thickness unevenness in the width direction of the film on the surface layer of the film roll (thickness unevenness in the maximum concave portion and in the entire width direction) is as described above.

A preferable embodiment of the present invention is that thickness unevenness (thickness unevenness in the maximum concave portion and in the entire width direction) of all of samples, which are collected per 1000 m of the winding length and are measured, is within the predetermined range. The preferable range of the thickness unevenness in the film width direction and along the entire length of the film roll (thickness unevenness in the maximum concave portion and in the entire width direction) is as described above.

EXAMPLES

Next, the present invention will be described specifically by way of Examples and Comparative Examples, but is not limited to the embodiments of these Examples at all, and can be changed as appropriate without departing from the gist of the present invention.

Evaluation methods used in the present invention will be as follows. Incidentally, unless described otherwise, 1 m of a film was removed from a surface layer of a film roll, and a film or a film roll in a surface layer part after the removal was evaluated.

[Heat-Shrinkage Ratio in Main Shrinkage Direction]

The film was cut into a foursquare of 10 cm×10 cm, and was treated in hot water at a hot-water temperature of 90° C.±0.5° C. with no load for 10 seconds so as to be heat-shrunk, and thereafter, a dimension along a transverse direction (main shrinkage direction) of the film was measured, thereby obtaining a heat-shrinkage ratio according to following Formula (1).

Heat-Shrinkage Ratio=((Length before Shrinkage–Length after Shrinkage)/Length before Shrinkage)×100(%)  Formula (1)

[Thickness Unevenness in Entire Width Direction]

A roll was set into a slitter. Subsequently, after removing 1 m from a surface layer of the roll, a sample of an entire width along a width direction and 40 mm along a longitudinal direction of the film roll was taken, a thickness thereof was measured continuously at 5 m/s along the width direction by a continuous contact-type thickness meter produced by MIKURON.com. Thickness unevenness in the width direction of the film was calculated from below Formula (2), where a maximum thickness is denoted by Tmax., a minimum thickness is denoted by Tmin., and an average thickness is denoted by Tave. at the time of the measurement.

Thickness Unevenness={(Tmax.–Tmin.)/Tave.}×100 (%)  Formula (2)

[Thickness Unevenness in Concave Portion]

The above-described continuous contact thickness along the width direction was obtained, and a position that was a maximum concave portion as shown in FIG. 1 was found. Unevenness in the maximum concave portion was obtained by following Formula (3). Further, if heights of both ends of the maximum concave portion were different, a higher value was selected for obtaining the thickness unevenness.

Thickness Unevenness in Maximum Concave Portion=(Maximum Height Thickness in Maximum Concave Portion–Minimum Height Thickness in Maximum Concave Portion)/Average Thickness×100(%)  Formula (3)

[Thickness Unevenness in Maximum Concave Portion in Roll Width Direction along Roll Winding Length]

A roll was set into the slitter. Subsequently, after removing 1 m from a surface layer of the roll, thickness unevenness in the maximum concave portion in the width direction of the roll was measured by the above-described method. After the measurement, 1000 m of the film was rewound by the slitter, and thickness unevenness in the concave portion along the roll width direction was measured by the above-described method. After rewinding 1000 m of the film, such measurement of thickness unevenness in a maximum concave portion along the roll width direction was repeated.

[Difference in Refractive Index between Maximum Concave Portion and Both Ends of Maximum Concave Portion]

Refractive indices of the film in the width direction in the above-described maximum concave portion and at the higher location of the both ends of the maximum concave portion were measured by an Abbe refractometer. Then, a difference between them was obtained by following Formula (4), and an absolute value thereof was obtained.

Difference in Refractive Index between Maximum Concave Portion and Both Ends of Maximum Concave Portion=|Refractive Index in Maximum Concave Portion in Width Direction–Refractive Index at Higher Location of Both Ends of Maximum Concave Portion in Width Direction 1|                          Formula (4)

[Friction Coefficient]

In accordance with JIS K-7125, a static friction coefficient and a dynamic friction coefficient in the case of contacting a front surface and a rear surface of the film were obtained under environment at 23° C. and 65% RH by using a tension tester (TENSILON produced by ORIENTEC Co., LTD). Incidentally, a weight of a thread (dead-weight) with the film wound on an upper side was 1.5 kg, and a size of a bottom area of the thread had a length of 63 mm×a width of 63 mm. Further, tensile speed during the friction measurement was 200 mm/min.

[Evaluation on Sag]

From the film roll, a sample having the entire width along the width direction and 4 m or more and 6 m or less along the longitudinal direction was taken, and was put onto a flat table. At this time, if a belt-shaped position, where flatness was even a little poorer continuously along the longitudinal direction than other part, was observed by visual recognition, this position was determined as sag. The evaluation was performed based on following criteria.

No Sag: ○

Sag Was Found at One or More Positions: ×

[Evaluation on Winding Hardness]

Winding hardness was measured at an interval of 100 mm from an end portion along the width direction of the roll by using PAROtester 2, a hardness tester produced by Proceo SA in Switzerland. An average value of the values obtained by the measurement along the width direction of the roll was used as a measurement value.

[Preparation of Polyester Raw Materials]

Synthesis Example 1 (Synthesis of Polyester)

In an esterification reactor, 57036 parts by mass of terephthalic acid (TPA); 33244 parts by mass of ethyleneglycol (EG); 15733 parts by mass of neopentylglycol (NPG); 23.2 parts by mass of antimony trioxide as a polycondensation catalyst; 5.0 parts by mass of sodium acetate (alkali metal compound); and 46.1 parts by mass of trimethylphosphate (phosphorus compound) were prepared, pressure therein was adjusted to be 0.25 MPa, and these materials were stirred at 220° C. to 240° C. for 120 minutes, thereby causing an esterification reaction. After returning the pressure in the reactor to normal pressure, 3.0 parts by mass of cobalt acetate tetrahydrate and 124.1 parts by mass of magnesium acetate tetrahydrate were added to the materials, the materials were stirred at 240° C. for 10 minutes, and 75 minutes were spent to decrease the pressure to 1.33 hPa and to increase the temperature to 280° C. Stirring was continued until melt viscosity becomes 4500 poise at 280° C. (for about 70 minutes), and the stirred materials in a strand state were discharged into water. The discharged product was cut by a strand cutter so as to obtain Chip B. Limiting viscosity of Chip B was 0.73 dl/g.

Synthetic Example 2

By a method similar to that of Synthetic Example 1, Chips A and C having compositions shown in Table 1 were obtained. In the table, NPG is an abbreviation of neopentylglycol, BD is an abbreviation of butanediol, and CHDM is an abbreviation of cyclohexanedimethanol. Incidentally, into Chip A, $SiO_2$ (Silysia 266 produced by FUJI SILYSIA CHEMICAL LTD.) was added as a lubricant by a proportion of 3,000 ppm with respect to polyester. Limiting viscosity of Chips A, C and E was 0.73 dl/g, and limiting viscosity of Chip D was 0.92 dl/g.

TABLE 1

| | Raw Material Composition of Polyester (mol %) | | | | | |
|---|---|---|---|---|---|---|
| | Dicarboxylic Acid Component | Polyhydric Alcohol Component | | | | Lubricant Adding Amount |
| | DMT | EG | NPG | BD | CHDM | (ppm) |
| Chip A | 100 | 100 | — | — | — | 3000 |
| Chip B | 100 | 100 | — | — | — | 0 |
| Chip C | 100 | 70 | 30 | — | — | 0 |
| Chip D | 100 | — | — | 100 | — | 0 |
| Chip E | 100 | 70 | — | — | 30 | 0 |

Example 1

<Method for Manufacturing Heat-Shrinkable Film>

Above-described Chips A, B, C and D were individually pre-dried, and as shown in Table 2, 20% by mass of Chip A; 5% by mass of Chip B; 60% by mass of Chip C; and 15% by mass of Chip D were mixed and put into an extruder. At this time, the three kinds of the raw materials were put into the extruder, while they are stirred by an agitator directly above the extruder. This mixed resin was melt at 260° C., was extruded from a T-die in conditions of a shear rate of 190 $sec^{-1}$ and a draft ratio of 30, and was quenched by being in contact with a rotating metal roll which was cooled to have a surface temperature of 30° C., thereby obtaining an undrawn film with a thickness of 138 μm. Tg of the undrawn film at this time was 69° C.

The above-described undrawn film was introduced into a tenter (transversely drawing machine). A temperature in a preheating process was increased to 90° C. Thereafter, the undrawn film was drawn by 1.5 times at a drawing temperature of 75° C. in a first-stage drawing step. The one-stage drawn film was held at 75° C., and was subsequently drawn at 72° C. by 1.5 times in a second-stage drawing step (2.25 times in total). The two-stage drawn film was held at 72° C., and was subsequently drawn at 70° C. by 2.44 times in a third-stage drawing step (5.5 times in total). The film drawn by 5.5 times in the three stages was treated by heat at 80° C. for 10 seconds in a tension state. Thereafter, the drawn film was cooled, both marginal parts thereof were cut and removed, and the drawn film was wound into a roll shape with a width of 4200 mm, thereby continuously manufacturing the drawn film with a thickness of 25 μm to have a predetermined length.

The above-obtained transversely drawn film was slit by a slitter to have a width of 2200 mm, a size of 1200 mm and 800 mm and a winding length of 15000 m.

As the specific slitting conditions, initial tension was 100 N/m, and initial surface pressure was 310 N/m when starting the slitting. The tension was decreased at a rate of 0.239%/m while the winding length was 500 m to 14700 m, and was set to be 66 N/m while the winding length was 14700 m to 15000 m. Further, the slitting was performed so that the surface pressure might be constant at 310 N/m.

By slitting as described above, film rolls with widths of 2200 mm, 1200 mm and 800 mm and winding lengths of 15000 m were obtained.

Then, properties of the obtained films were evaluated by the above-described methods. Evaluation results will be shown in Table 3. The films that exhibited the aimed properties were obtained, and their results on sag were favorable. Incidentally, as results of the evaluation on sag of all of the samples of every 1000 m, in addition to the results in Table 3 (of surface layers of the film rolls), all of the samples of the above-described three film rolls were evaluated as ○ (no sag).

Example 2

Film rolls were obtained by a method similar to that of Example 1 except for using Chip E as a replace of above-described Chip C. Further, Tg at this time was 69° C.

Then, properties of the obtained films were evaluated by the above-described methods. Evaluation results will be shown in Table 3. The obtained films exhibited favorable results similarly to those of Example 1.

Example 3

Film rolls were obtained by a method similar to that of Example 1 except that the thicknesses of the undrawn films were 209 μm, the preheating temperature during the transverse drawing was changed from 90° C. to 95° C., and the thicknesses of the obtained films were 38 μm.

Then, properties of the obtained films were evaluated by the above-described methods. Evaluation results will be shown in Table 3. The obtained films exhibited favorable results similarly to those of Example 1.

Example 4

Film rolls were obtained by a method similar to that of Example 1 except that the thicknesses of the undrawn films were 83 μm, and the thicknesses of the obtained films were 15 μm.

Then, properties of the obtained films were evaluated by the above-described methods. Evaluation results will be shown in Table 3. The obtained films exhibited favorable results similarly to those of Example 1.

Comparative Example 1

Above-described Chips A, B, C and D were individually pre-dried, and as shown in Table 2, 20% by mass of Chip A; 5% by mass of Chip B; 60% by mass of Chip C; and 15% by mass of Chip D were mixed and put into an extruder. This mixed resin was melt at 260° C., was extruded from a T-die in conditions of a shear rate of 190 $\sec^{-1}$ and a draft ratio of 30, and was quenched by being in contact with a rotating metal roll which was cooled to have a surface temperature of 30° C., thereby obtaining an undrawn film with a thickness of 138 μm. Tg of the undrawn film at this time was 69° C.

The above-described undrawn film was introduced into a tenter (transversely drawing machine). A temperature in a preheating process was increased to 90° C. Thereafter, the undrawn film was drawn at once by 5.5 times at 75° C. The film drawn by 5.5 times was treated by heat at 80° C. for 10 seconds in a tension state. Thereafter, the drawn film was cooled, both marginal parts thereof were cut and removed, and the drawn film was wound into a roll shape with a width of 4200 mm, thereby continuously manufacturing the drawn film with a thickness of 25 μm to have a predetermined length.

The above-obtained transversely drawn film was slit by a slitter to have a width of 2200 mm, a size of 1200 mm and 800 mm and a winding length of 15000 m.

As the specific slitting conditions, initial tension was 100 N/m, and initial surface pressure was 310 N/m when starting the slitting. The tension was decreased at a rate of 0.239%/m while the winding length was 500 m to 14700 m, and was set to be 66 N/m while the winding length was 14700 m to 15000 m. Further, the slitting was performed so that the surface pressure might be constant at 310 N/m.

By slitting as described above, film rolls with widths of 2200 mm, 1200 mm and 800 mm and winding lengths of 15000 m were obtained.

Then, properties of the obtained films were evaluated by the above-described methods. Evaluation results will be shown in Table 3. Thickness unevenness was poor in the concave portions, and sag was observed on the films.

Comparative Example 2

Film rolls were obtained by a method similar to that of Comparative Example 1 except that the thicknesses of the undrawn films were 209 μm, the preheating temperature during the transverse drawing was changed from 90° C. to 95° C., and the thicknesses of the obtained films were 38 μm.

Then, properties of the obtained films were evaluated by the above-described methods. Evaluation results will be shown in Table 3. Sag was observed on the obtained films similarly to that of Comparative Example 1. Incidentally, as results of the evaluation on sag of all of the samples of every 1000 m, in addition to the results in Table 3 (of surface layers of the film rolls), all of the samples of the above-described three film rolls were evaluated as × (sag was found at one or more positions).

TABLE 2

| | Resin Composition | Amount of Monomer in Amorphous Component (mol %) | Use or Not Use of Agitator Directly Above Extruder | Extrusion and Shear Rate ($\sec^{-1}$) | Transversely Drawing Conditions | | | |
|---|---|---|---|---|---|---|---|---|
| | | | | | Preheating Temperature (° C.) | Drawing Temperature (° C.) | | |
| | | | | | | $1^{st}$ Stage | $2^{nd}$ Stage | $3^{rd}$ Stage |
| Example 1 | A/B/C/D = 20/5/60/15 | 18 | Use | 190 | 90 | 75 | 72 | 70 |
| Example 2 | A/B/D/E = 20/5/15/60 | 18 | Use | 190 | 90 | 75 | 72 | 70 |

TABLE 2-continued

| | | | | | | | | |
|---|---|---|---|---|---|---|---|---|
| Example 3 | A/B/C/D = 20/5/60/15 | 18 | Use | 289 | 95 | 75 | 72 | 70 |
| Example 4 | A/B/C/D = 20/5/60/15 | 18 | Use | 114 | 90 | 75 | 72 | 70 |
| Comparative Example 1 | A/B/C/D = 20/5/60/15 | 18 | Not Use | 190 | 90 | Performed Only One-Stage Drawing at 75° C. | | |
| Comparative Example 2 | A/B/C/D = 20/5/60/15 | 18 | Not Use | 289 | 95 | Performed Only One-Stage Drawing at 75° C. | | |

| | Transversely Drawing Conditions | | | | | Slitting Conditions | | |
|---|---|---|---|---|---|---|---|---|
| | Draw Ratio (Times) | | | Total Draw Ratio (Times) | Final Heat Treatment Temperature (° C.) | Initial Tension (N/m) | Final Tension (N/m) | Surface Pressure (N/m) |
| | 1st Stage | 2nd Stage | 3rd Stage | | | | | |
| Example 1 | 1.5 | 1.5 | 2.44 | 5.5 | 80 | 100 | 66 | 310 |
| Example 2 | 1.5 | 1.5 | 2.44 | 5.5 | 80 | 100 | 66 | 310 |
| Example 3 | 1.5 | 1.5 | 2.44 | 5.5 | 80 | 100 | 66 | 310 |
| Example 4 | 1.5 | 1.5 | 2.44 | 5.5 | 80 | 100 | 66 | 310 |
| Comparative Example 1 | Performed Only One-Stage Drawing at 75° C. | | | 5.5 | 80 | 100 | 66 | 310 |
| Comparative Example 2 | Performed Only One-Stage Drawing at 75° C. | | | 5.5 | 80 | 100 | 66 | 310 |

TABLE 3

| | Width of Film Roll (mm) | Winding Length of Film Roll (mm) | Average Thickness (μm) | Shrinkage Ratio in Width Direction at 90° C. (%) | Surface Layer of Roll | | Maximum Value of Samples per 1000 m from Roll Surface Layer to Winding Core | |
|---|---|---|---|---|---|---|---|---|
| | | | | | Thickness Difference in Maximum Concave Portion (μm) | Thickness Unevenness in Maximum Concave Portion (%) | Thickness Difference in Maximum Concave Portion (μm) | Thickness Unevenness in Maximum Concave Portion (%) |
| Example 1 | 2200 | 15000 | 25 | 72 | 1.5 | 6 | 2 | 8 |
| | 1200 | 15000 | 25 | 72 | 1.2 | 4.8 | 1.7 | 6.8 |
| | 800 | 15000 | 25 | 72 | 0.8 | 3.2 | 1.3 | 5.2 |
| Example 2 | 2200 | 15000 | 25 | 74 | 1.9 | 7.6 | 2.3 | 9.2 |
| | 1200 | 15000 | 25 | 74 | 1.4 | 5.6 | 1.7 | 6.8 |
| | 800 | 15000 | 25 | 74 | 0.9 | 3.6 | 1.3 | 5.2 |
| Example 3 | 2200 | 15000 | 38 | 73 | 2.5 | 6.6 | 3 | 7.9 |
| | 1200 | 15000 | 38 | 73 | 2.1 | 5.5 | 2.7 | 7.1 |
| | 800 | 15000 | 38 | 73 | 1.4 | 4 | 1.8 | 4.7 |
| Example 4 | 2200 | 15000 | 15 | 70 | 1 | 6.7 | 1.5 | 10 |
| | 1200 | 15000 | 15 | 70 | 0.8 | 5.3 | 1.2 | 8 |
| | 800 | 15000 | 15 | 70 | 0.6 | 4 | 1.3 | 8.7 |
| Comparative Example 1 | 2200 | 15000 | 25 | 72 | 3.3 | 13.2 | 4 | 16 |
| | 1200 | 15000 | 25 | 72 | 2.8 | 11.2 | 3.6 | 14.4 |
| | 800 | 15000 | 25 | 72 | 2.7 | 10.8 | 3.4 | 13.6 |
| Comparative Example 2 | 2200 | 15000 | 38 | 74 | 4.5 | 11.8 | 5.6 | 14.7 |
| | 1200 | 15000 | 38 | 73 | 4 | 10.5 | 4.8 | 12.6 |
| | 800 | 15000 | 38 | 74 | 3.9 | 10.3 | 4.5 | 11.8 |

| | Width of Film Roll (mm) | Refractive Index Difference in Width Direction in Maximum Concave Portion | Thickness Unevenness in Entire Width Direction of Film Roll (%) | Static Friction Coefficient | Dynamic Friction Coefficient | Winding Hardness of Surface Layer of Roll | Presence or Absence of Sag |
|---|---|---|---|---|---|---|---|
| Example 1 | 2200 | 0.0022 | 8 | 0.05 | 0.042 | 666 | ○ |
| | 1200 | 0.001 | 6 | 0.049 | 0.041 | 675 | ○ |
| | 800 | 0.0003 | 5.5 | 0.05 | 0.041 | 672 | ○ |
| Example 2 | 2200 | 0.0024 | 9 | 0.052 | 0.044 | 671 | ○ |
| | 1200 | 0.0013 | 6.8 | 0.054 | 0.046 | 681 | ○ |
| | 800 | 0.0006 | 5.5 | 0.053 | 0.045 | 677 | ○ |

TABLE 3-continued

| | | | | | | | |
|---|---|---|---|---|---|---|---|
| Example 3 | 2200 | 0.0028 | 8 | 0.05 | 0.04 | 725 | ○ |
| | 1200 | 0.0021 | 7 | 0.05 | 0.041 | 736 | ○ |
| | 800 | 0.0012 | 6 | 0.05 | 0.04 | 730 | ○ |
| Example 4 | 2200 | 0.0025 | 8.8 | 0.048 | 0.039 | 633 | ○ |
| | 1200 | 0.0018 | 7.5 | 0.048 | 0.039 | 646 | ○ |
| | 800 | 0.0015 | 6 | 0.049 | 0.04 | 641 | ○ |
| Comparative Example 1 | 2200 | 0.0055 | 15.5 | 0.048 | 0.04 | 666 | x |
| | 1200 | 0.0045 | 13 | 0.051 | 0.042 | 678 | x |
| | 800 | 0.0033 | 12.5 | 0.048 | 0.04 | 673 | x |
| Comparative Example 2 | 2200 | 0.0108 | 13.5 | 0.052 | 0.041 | 719 | x |
| | 1200 | 0.0088 | 12.8 | 0.053 | 0.042 | 728 | x |
| | 800 | 0.0083 | 12.8 | 0.051 | 0.041 | 725 | x |

INDUSTRIAL APPLICABILITY

The heat-shrinkable polyester film roll of the present invention is favorable in terms of sag as described above, and thus can be used preferably in processing such as printing.

The invention claimed is:

1. A heat-shrinkable polyester-based film roll, which is obtained by winding a heat-shrinkable polyester-based film that has a shrinkage ratio of 30% or more in a film main shrinkage direction in hot water at 90° C. for 10 seconds, the heat-shrinkable polyester film and the film roll satisfying following requirements (1) to (6):
   (1) a winding length of the film roll is 2000 m or more and 25000 m or less;
   (2) a width of the film roll is 400 mm or more and 2500 mm or less;
   (3) a thickness of the film is 5 μm or more and 40 μm or less;
   (4) in thickness unevenness in a width direction of the film on a surface layer of the film roll, there are positions having concave thickness patterns, and in a concave portion that has a maximum thickness difference denoting a maximum concave portion, thickness unevenness in the maximum concave portion, which is obtained from the maximum thickness difference in the maximum concave portion and an average thickness of the film is 10% or less;
   (5) winding hardness of the surface layer of the film roll is 400 or more and 800 or less; and
   (6) an absolute value of a difference between refractive index in the width direction at a maximum thickness position of either of both ends of the concave portion and at the minimum thickness position of the concave portion in the maximum concave portion is 0.01 or less.

2. The film roll made of the heat-shrinkable polyester-based film according to claim 1, wherein
   in thickness unevenness in the width direction of the film of each of samples which are obtained by sampling from the surface layer of the film roll at an interval of 1000 m in winding length,
   the thickness unevenness of all of the samples, each of which is obtained from the maximum thickness difference in the maximum concave portion and the average thickness of the film, is 10% or less.

3. The heat-shrinkable polyester-based film roll according to claim 1, wherein thickness unevenness in an entire width direction of the film roll is 13% or less.

4. The heat-shrinkable polyester-based film roll according to claim 1, wherein both of a static friction coefficient and a dynamic friction coefficient between a winding outer surface and a winding inner surface of the film are 0.1 or more and 0.8 or less.

5. The heat-shrinkable polyester-based film roll according to claim 2, wherein thickness unevenness in an entire width direction of the film roll is 13% or less.

6. The heat-shrinkable polyester-based film roll according to claim 5, wherein both of a static friction coefficient and a dynamic friction coefficient between a winding outer surface and a winding inner surface of the film are 0.1 or more and 0.8 or less.

* * * * *